United States Patent

Naguib

[15] 3,660,029
[45] May 2, 1972

[54] PROCESS FOR BENEFICIATING ILMENITE

[72] Inventor: Ahmed G. E. Naguib, Jacksonville, Fla.
[73] Assignee: Edith W. Carpenter, Jacksonville, Fla.
[22] Filed: Apr. 9, 1971
[21] Appl. No.: 132,899

Related U.S. Application Data

[63] Continuation-in-part of Ser. No. 62,612, Aug. 10, 1970.

[52] U.S. Cl. .................................23/202 R, 75/1, 75/101
[51] Int. Cl. ..........................................C01g 23/04
[58] Field of Search..............................23/202 R; 75/1, 101

[56] References Cited

UNITED STATES PATENTS

| | | | |
|---|---|---|---|
| 2,127,247 | 8/1938 | Dawson et al. | 23/202 R |
| 2,954,278 | 9/1960 | Gaskin et al. | 23/202 R |
| 3,446,590 | 5/1969 | Michal et al. | 23/202 R |
| 3,457,037 | 7/1969 | Aramendia et al. | 23/202 R |

FOREIGN PATENTS OR APPLICATIONS

| | | | |
|---|---|---|---|
| 1,160,667 | 8/1969 | Great Britain | 23/202 R |
| 1,167,833 | 10/1969 | Great Britain | 23/202 R |

*Primary Examiner*—Herbert T. Carter
*Attorney*—Birch, Swindler, McKie & Beckett

[57] ABSTRACT

A process for treating ilmenite to obtain a beneficiated product having a relatively high titanium dioxide content. Particulate ilmenite is first heated in the presence of a reducing agent to reduce the iron compounds in the ilmenite to ferrous oxide and/or metallic iron. The resulting product is then leached with a dilute inorganic acid to solubilize the reduced iron values. The liquor produced during leaching is then filtered from the unsolubilized residue, and the latter is subjected to a combination of process steps. Such steps include magnetic separation to remove essentially all of the iron valves remaining in the residue, and electrical separation to remove essentially all of the silicon values therein. Also, the residue is roasted at a relatively high temperature to drive off the water of crystallization which associates therewith during leaching. The final product contains up to 98 percent titanium dioxide by weight.

20 Claims, No Drawings

PROCESS FOR BENEFICIATING ILMENITE

RELATED APPLICATION

This application is a continuation-in-part application of application Ser. No. 62,612, filed Aug. 10, 1970.

BACKGROUND OF THE INVENTION

1. Field of the Invention

This invention relates to processes for beneficiating mineral ores, and specifically to a process for beneficiating relatively low grade ilmenite to obtain a product having a relatively high titanium dioxide content.

2. Description of the Prior Art

Many processes are known for beneficiating titaniferous ores, and specifically ilmenite. Examples of such processes are disclosed in Von Bichowsky U.S. Pat. No. 1,902,203, Dawson et al. U.S. Pat. No. 2,127,247, Pike U.S. Pat. No. 2,903,341 and Aramendia et al. U.S. Pat. No. 3,457,037. The processes disclosed in these patents include the steps of reduction and leaching. Depending upon the amount of reduction, the iron compounds originally contained in the ilmenite, i.e. ferric and ferrous oxide, are reduced in varying amounts to ferric and ferrous oxide and metallic iron. During the subsequent leaching step, the iron values are solubilized in varying amounts leaving a residue which is rich in titanium dioxide.

The above-described prior art processes have been moderately successful for beneficiating relatively high grade ilmenite containing, for example, greater than 50 percent titanium dioxide by weight, to levels which are commercially acceptable for use in processes which utilize titanium dioxide as the feed material, such as processes for producing titanium dioxide pigment, coordination catalysts and titanium metal. However, the prior art processes for beneficiating ilmenite have not been able to produce a high grade product, i.e. a product containing no less than approximately 93 percent titanium dioxide by weight, from low grade ilmenite containing, for example, 42–44 percent titanium dioxide by weight. Unfortunately, the largest known deposits of natural ilmenite are of the low grade type. As the natural deposits of rutile and high grade ilmenite are expended, the necessity of utilizing low grade ilmenite has become more urgent. At the present rate of consumption the known natural deposits of rutile and high grade ilmenite will be consumed within a few years. Thus, there is great demand for an economical process for beneficiating low grade ilmenite to commercially acceptable levels for use in pigment, catalyst and metal production.

SUMMARY OF THE INVENTION

The present invention provides an economical process for obtaining a product containing commercially acceptable levels of titanium dioxide from low grade ilmenite. Basically described, the process comprises the steps of; heating particulate ilmenite at a temperature in the range of from about 600° C to about 900° C in the presence of a reducing agent until substantially all of the iron compounds contained in the ilmenite are reduced to ferrous oxide and/or metallic iron; leaching the resulting product with a dilute inorganic acid until substantially all of the iron values contained in the product are solubilized, Thereby producing a liquor containing ferric and ferrous salts and an unsolubilized particulate residue containing titanium values; filtering the liquor from the residue; magnetically separating from the residue essentially all of the iron values remaining therein; roasting the residue at a temperature in the range of from about 600° C to about 900° C until substantially all water of crystallization associated therewith is driven off; and electrically separating from the residue essentially all of the silicon values therein.

The magnetic and electrical separations may be performed either before or after roasting, and the magnetic separation may be performed either before or after the electrical separation. Also, the magnetic separation may be either a dry or wet separation, and the electrical separation may be either a contact electrification, conductive induction electrification or ion bombardment electrification separation.

The reducing and leaching are similar to the corresponding steps employed in the prior art processes. However, the combination of these steps and the magnetic separation, roasting and electrical separation distinguish the present process both technically and economically from the prior art processes, and produce a final product having a commercially acceptable titanium dioxide content. Indeed, the process of the present invention has been found to increase the titanium dioxide content of the final product by as much as thirteen percent above the results obtainable by the prior art processes. Thus, while magnetic separation, roasting and electrical separation have long been employed in various mineral beneficiation processes, the combination of steps of the present method, including reducing and leaching, and alternative sequential combinations of magnetic separation, roasting and electrical separation, comprise a unique process for obtaining a product containing no less than approximately 93 percent titanium dioxide by weight from low grade ilmenite.

Desirably, the reducing agent employed in the reducing step is hydrogen gas, and the acid employed in the leaching step is hydrochloric acid. As a result of using these agents, the hydrogen gas which is evolved during leaching may be recycled back to the reducing step. Also, the liquors produced during leaching may be treated in a conventional manner to produce ferric oxide or metallic iron and hydrochloric acid, and the latter may be recycled back to the leaching step. The process thus uses two of the effluents produced, namely hydrogen gas and hydrochloric acid. Also, the iron values leached from the ilmenite are not wasted but are recovered as a by-product, namely ferric oxide or metallic iron.

Preferably, the liquor produced during the leaching step is filtered from the unsolubilized residue by centrifuging to minimize the loss of relatively small particles of residue which contain titanium dioxide. Not only does the retention of such particles in the residue increase the grade of the final titanium dioxide product, but it similarly increases the grade of the ferric oxide or metallic iron by-product obtained from the leaching liquor.

With the foregoing in mind, it is an object of the present invention to provide an improved process for treating ilmenite to obtain a product having a relatively high titanium dioxide content.

It is a further object of the invention to provide a process as described in the preceding object in which the titanium dioxide content of the final product is no less than approximately 93 percent by weight and may be as high as approximately 98 percent by weight.

It is an additional object of the invention to provide a process as described in the preceding objects which includes the steps of reducing the iron compounds in the ilmenite and leaching the iron values from the reduced material, and alternative sequential combinations of the steps of magnetically separating from the unsolubilized leaching residue any iron values remaining therein, roasting the residue to drive off the water of crystallization associated therewith, and electrically separating from the residue the silicon values therein.

It is a further object of the invention to provide a process as described in the preceding object in which the roasting is performed at a temperature in the range of from about 600° C to about 900° C.

It is yet an additional object of the invention to provide a process as described in the preceding object in which the reducing and leaching agents may be recovered and recycled to the process.

It is also an object of the invention to provide a process as described in the preceding object in which ferric oxide or metallic iron is produced as a by-product.

These and other objects of the invention will become apparent upon a consideration of the following detailed description of a preferred embodiment thereof.

DESCRIPTION OF THE PREFERRED EMBODIMENT

The primary source of titanium dioxide for use as the feed material in processes for producing titanium dioxide pigment, coordination catalysts and titanium metal has been natural rutile which contains a relatively high percentage of titanium dioxide, i.e. a titanium dioxide content of greater than 95 percent by weight. The known rutile deposits are rapidly diminishing and at the present rate of consumption will be exhausted within a few years. Therefore, in order to satisfy the growing need for titanium dioxide it has become necessary to turn to ores which contain lesser percentages of titanium dioxide than rutile.

One such ore is high grade ilmenite containing, for example, greater than 50 percent titanium dioxide by weight. As described above, the prior art processes have been moderately successful for beneficiating high grade ilmenite to obtain a product containing commercially acceptable levels of titanium dioxide. However, as in the case of rutile, the known deposits of high grade ilmenite are being consumed at a rapid rate and will be depleted within a few years.

The most abundant ore containing titanium dioxide is low grade ilmenite. The chemical composition of a typical low grade ilmenite, as expressed by weight percentages, is shown in Table I.

TABLE I

| | | | |
|---|---|---|---|
| $TiO_2$ | 44.0% | MgO | 1.0% |
| FeO | 28.0% | $SiO_2$ | 1.5% |
| $Fe_2O_3$ | 22.0% | $Cr_2O_3$ | 0.25% |
| MnO | 1.0% | $V_2O_3$ | 0.15% |
| $Al_2O_3$ | 0.6% | $P_2O_5$ | 0.60% |
| CaO | 0.2% | Trace Minerals | 0.70% |

As indicated by the data shown in Table I, low grade ilmenite typically contains much less titanium dioxide than rutile. For example, the titanium dioxide content of low grade ilmenite may be as low as 42 percent by weight. Thus, the titanium dioxide content of low grade ilmenite generally is less than one-half the percentage contained in rutile.

The various commercial processes which have been adopted for producing titanium dioxide pigment, coordination catalysts and titanium metal require that the feed material employed in such processes have a titanium dioxide content of no less than approximately 93 percent by weight or greater if such processes are to be economical. Therefore, the use of low grade ilmenite as a feed material source for pigment, catalyst and metal production processes is dependent upon the development of an economical process for obtaining from such ilmenite a product containing more than twice the titanium dioxide content thereof.

As previously discussed, the prior art has offered several processes for purportedly achieving this result. While such processes have been moderately successful for beneficitating high grade ilmenite, they have not succeeded in producing a product from low grade ilmenite containing acceptable levels of titanium dioxide for use in pigment, catalyst and metal production processes. Use of the prior art processes thus has been limited to the beneficiation of high grade ilmenite.

The present invention is an improvement over such prior art processes and provides an economical process for achieving the desired beneficiation of low grade ilmenite as well as high grade ilmenite and leucoxene.

The process of the present invention comprises a combination of process steps for treating low grade ilmenite both physically and chemically. Such steps optimize various of the prior art procedures, and include additional procedures which result in the production of a final product having a titanium dioxide content which is increased from the levels obtainable by the prior art processes, i.e. 80–85 percent titanium dioxide by weight, to the levels required for commercial use, i.e. at least 93 percent titanium dioxide by weight. The economy of the process is enhanced by the recycling to the process of two of the effluents produced, namely hydrogen gas and hydrochloric acid, and by the production of a by-product, namely ferric oxide or metallic iron. Also, the feed material for the process preferably comprises naturally occurring particulate ilmenite of the type generally referred to as beach sand, or crushed and ground naturally occurring rock ilmenite, both of which are present in immense deposits both domestically and abroad. Moreover, the final product produced by the process also is a particulate material which is ideally suited as a feed material for the chlorination processes used for producing pigment, catalysts and metal. The process of the invention will now be described in detail.

Natural low grade particulate ilmenite is first heated at a temperature in the range of from about 600° C to about 900° C, and preferably in the range of from about 700° C to about 750° C, in the presence of a reducing agent until substantially all of the iron compounds originally contained therein are reduced to ferrous oxide and metallic iron. The reduction preferably is performed at ambient pressure in a conventional fluidized bed furnace to insure that the particulate feed material is substantially uniformly heated and exposed efficiently to the reducing agent. The reducing agent preferably is hydrogen gas, although other reducing agents, such as coal, a petroleum base liquid or mixture of such liquids, or methane may be employed. The reducing agent, whether hydrogen gas or one of the other reducing agents mentioned above, should be introduced into the furnace in excessive molar amounts for reducing all of the iron compounds contained in the feed material and also to effect the desired fluidization. The preferred ratio of reducing agent to feed material is about 0.06:1 by weight for hydrogen gas.

Substantially all of the iron compounds contained in the ilmenite, which originally are in the form of ferric and ferrous oxide, are reduced in a reasonable period of time to ferrous oxide and metallic iron with virtually no reduction of the titanium oxides. It has been found, for example, that for a feed material having a particle size range of −60, +250 Tyler mesh, approximately 96 percent of the iron compounds contained in the feed material are reduced to ferrous oxide and metallic iron after reduction with hydrogen gas at a temperature of about 700° C for approximately 110 minutes. Generally, the percentage by weight of metallic iron present in the resulting product is in the range of 5–15 percent, and preferably is in the range of 6–9 percent. Alternatively, all of the iron compounds contained in the feed material may be reduced to metallic iron, although such reduction generally is not economically attractive.

Several undesirable results are produced if the reduction is performed at temperatures greater than about 900° C. First, a portion of the ilmenite will undergo an allotropic recrystallization producing titaniferous compounds which are not amenable to treatment by the subsequent steps of the process. Second, a portion of the titanium values will be reduced, producing less stable titanium oxides which will be solubilized during the subsequent leaching step. Third, some of the particles will be sintered together producing agglomerated particles of increased size from which the iron values cannot be leached readily. At temperatures below about 600° C, reduction of the iron compounds will be incomplete and inefficient.

The product resulting from the reducing step preferably is subjected to a dry magnetic separation in which substantially all of the unreduced ferric oxide is removed. The particles containing ferric oxide have a lower magnetic susceptibility than the particles containing the reduced iron values, and the former readily may be separated from the latter with a lift-type induced roll magnetic separator of the type disclosed in Grieve et al. U.S. Pat. No. 3,504,792. In this separator, the product resulting from the reducing step is vibratingly fed along a substantially horizontal path into proximity with an inductively magnetized rotor. The strength of the magnetic field in which the rotor is disposed and the velocity of the rotor are adjusted to obtain a differential displacement of the particles of greater and lesser magnetic susceptibility, thereby separating such particles. The separated particles containing ferric oxide are then recycled back to the reducing step.

After the unreduced ferric oxide has been removed from the reduced material, the latter is leached in a conventional manner, such as in an ordinary leaching vessel. The leaching agent employed is a dilute inorganic acid, and preferably is dilute hydrochloric acid, although dilute sulphuric, nitric, phosphoric or hydrofluoric acid may be employed. The dilute acid preferably is an aqueous-acid solution having an acid concentration in the range of from about 22 percent to about 25 percent acid by weight. The reaction which occurs within the vessel comprises a conventional leaching of the more soluble iron values by the dilute acid. The acid preferentially attacks the metallic iron and ferrous oxide present in the reduced material, while at the dilute concentrations employed, has little effect on the titanium values. However, at concentrations above about 25 percent, significant amounts of the titanium values will begin to be solubilized with no compensating acceleration in the solubilization rate of the iron values. At concentrations below about 22 percent of the solubilization rate of the iron values decreases rapidly and becomes inefficient. The dilute acid, whether hydrochloric acid or one of the other acids mentioned above, should be introduced into the vessel in excessive molar amounts for solubilizing all of the iron values contained in the reduced material. The preferred ratio of acid to reduced material is about 4.9:1 by weight for hydrochloric acid having a concentration of about 22 percent acid by weight.

Preferably, the reduced material is introduced into one end of the vessel and the acid is introduced into the other so that the acid flow is counter to the passage of material through the vessel. This arrangement results in the material freshly introduced into the vessel being attacked by a liquor containing acid and ferric and ferrous salts, whereas the fresh acid attacks reduced material from which a substantial amount of the iron values already have been leached. The temperature at which the leaching is performed preferably should be greater than about 100° C to insure an efficient and relatively rapid solubilization of the iron values, although lower temperatures may be employed. Also, the leaching temperature preferably is maintained below the boiling point of the acid being used, to prevent the acid from boiling off and being wasted, although higher temperatures may be employed. The boiling point of the preferred dilute hydrochloric acid is about 110° C.

The pressure at which the leaching is performed preferably is atmospheric pressure, although pressures greater than atmosphere pressure may be employed. Generally the pressure within the vessel will tend to increase slightly above atmospheric pressure as a result of the gases evolved during the leaching. If the leaching agent is hydrochloric acid, the principal gas evolved will be hydrogen gas. This effluent preferably is recycled back to the reducing step to therefore reduce the amount of fresh hydrogen gas required to achieve the desired reduction.

At the conclusion of the leaching step, substantially all of the iron values present in the reduced material will be solubilized. It has been found, for example, that approximately 98 percent of the iron values are solubilized in approximately 10 hours under the leaching conditions specified above, while only approximately 1 percent of the titanium values are solubilized. As previously mentioned, the liquor produced during the leaching step contains solubilized ferric and ferrous salts, and preferably ferric and ferrous salts of chlorine. The unsolubolized residue is a particulate material containing a relatively high percentage of titanium dioxide, i.e. 83–85 percent titanium dioxide by weight, along with any unsolubilized iron compounds and the silicon values contained in the ilmenite feed material. Also, approximately one-half of the positive valence element values contained in the ilmenite feed material other than titanium, iron and silicon, i.e. mangnesium, aluminum, phosphorous, chromium, calcium and vanadium, are solubilized and therefore are contained in the liquor, while approximately one-half of such values are unsolubilized and therefore are contained in the residue. The size of the residue particles is of the same order of magnitude as the size of the original feed material.

The liquor is then filtered from the residue, and preferably treated separately as discussed below to obtain ferric oxide or metallic iron as a by-product. The residue is removed for further processing to upgrade the titanium dioxide content thereof to the level of the desired commercial product. The filtering step preferably is performed by centrifuging to minimize the loss of fine particles of the residue into the liquor. Such fine particles contain a high percentage of titanium dioxide and their loss in the liquor not only depreciates the grade of the final titanium dioxide product, but also degrades the ferric oxide or metallic iron by-product obtained from the liquor.

After filtering, the residue is washed and then treated by a combination of process steps which includes magnetic separation, roasting and electrical separation.

In the preferred embodiment of the process of the invention, the washed residue is dried in a conventional dryer, for example, a conventional gas fired rotary dryer, to drive off the surface liquid remaining on the residue particles. The residue is then subjected to a high intensity dry magnetic separation to remove therefrom essentially all of the iron values remaining therein. The particles containing iron values have a greater magnetic susceptibility than do the other particles of the residue, and after separation The former are recycled back to the leaching step. The separator employed for performing this latter magnetic separation may be an induced roll magnetic separator of the type disclosed in Carpenter U.S. Pat. No. 2,767,843. In this separator, the residue is fed down an inclined path and sequentially past a plurality of inductively magnetized rotors. Upon each pass of the residue past one of the rotors, the particles of greater and lesser magnetic susceptibility are deflected differentially and thereby separated. The separated fractions from one pass may form the feed materials for successive passes past different rotors. The flow of residue through the separator is adjusted to provide the most efficient and economical separation. This magnetic separation increases the titanium dioxide content of the leaching residue by approximately 2–3 percent by weight to thus raise the titanium dioxide content of the residue to approximately 85–88 percent by weight for a typical low grade ilmenite feed material.

Following the last mentioned magnetic separation, the leaching residue is roasted at a relatively high temperature to drive off the water of crystallization which associates therewith during the leaching step. Such roasting is performed at a temperature in the range of from about 600° C to about 900° C, and preferably in the range of from about 650° C to about 750° C. The exact roasting temperature employed is dependent upon the porosity of the leaching residue and types of pores therein. Generally, the greater the porosity, the lower the roasting temperature required. At temperatures below about 600° C the roasting is inefficient, while at temperatures above about 900° C sintering may occur. For a typical low grade ilmenite feed material, roasting at approximately 700° C for approximately 20 minutes is sufficient to drive off all of the water of crystallization associated with the leaching residue. During roasting, the water of crystallization is not only driven off, but substantially all of the titanium values contained in the residue in the form of unstable oxides are converted to titanium dioxide. The roasting thus effects a physical change in the crystalline structure of the less stable oxides of titanium. The roasting increases the titanium dioxide content of the residue by approximately 5–7 percent by weight, thus increasing the titanium dioxide content thereof to 90–95 percent by weight. For typical low grade ilmenite having a titanium dioxide content of 42–44 percent by weight, the roasted product will have a titanium dioxide content of approximately 91 percent by weight.

Finally, the roasted product is subjected to an electrical separation, and preferably an ion bombardment electrification separation, to remove therefrom essentially all of the silicon values therein. The particles containing silicon values are less electrically conductive than are the particles containing titanium dioxide. The separator employed for performing this electrical separation may be an ion bombardment electrification separator of the type disclosed in Breakiron et al. U.S. Pat. No. 3,322,375. In this separator, the roasted product is fed onto a grounded conductive rotor and charged by a corona discharge pulsed at a relatively high pulse rate. The particles of greater conductivity lose their charge to the rotor rapidly and are repelled therefrom, whereas the particles of lesser conductivity lose their charge to the rotor slowly and are pinned thereto. This electrical separation increases the titanium dioxide content of the roasted product by approximately three percent by weight to thus raise the titanium dioxide content of the final product to approximately 93–98 percent by weight. This product is well suited for use in commercial titanium dioxide pigment, coordination catalyst and titanium metal production processes. Moreover, the particle size of the final product is the same order of magnitude as the initial ilmenite feed material which facilitates direct use of the product in chlorination processes.

Alternatively, the electrical separation may be performed before the magnetic separation and roasting or after the magnetic separation and before roasting. If the electrical separation precedes the magnetic separation, the silicon values are first separated from the titanium and iron values, and the iron values then separated from the titanium values.

In one alternative embodiment of the process of the invention, the washed residue from the leaching step is dried and roasted in a single step, and the roasted product then subjected to magnetic and electrical separations. Either of the latter two separations may be performed first. In this embodiment the iron values removed from the roasted product will have been oxidized during the roasting step, and therefore must be recycled back to the initial reducing step.

In another alternative embodiment of the process of the invention, the washed residue from the leaching step is subjected to a wet magnetic separation, and then roasted and subjected to electrical separation. The separator employed for performing this wet magnetic separation may be of the type disclosed in Carpenter U.S. Pat. No. 3,375,925. In this separator, the leaching residue is fed in a slurry into a movably mounted foraminous container in which are disposed a plurality of magnetically susceptible, individually movable bodies, such as a plurality of spherical bodies made from an alloy of iron. The container is moved between the poles of an electromagnet so that the magnetically susceptible bodies are inductively magnetized, and a water wash is introduced into the top of the container. Due to the attraction of the particles of greater magnetic susceptibility, which contain iron values, for the inductively magnetized bodies, such particles are impeded in their passage through the interstices between the bodies and are retained in the container while the particles of lesser magnetic susceptibility, which contain titanium values, are flushed out of the container. The container is then moved from between the magnet poles so that the magnetically susceptible bodies are demagnetized, and a further water wash is introduced into the top of the container. The particles of greater magnetic susceptibility are then flushed out of the container. An advantage of this embodiment is that the expense of a separate drying step may be eliminated. Also, the iron values removed from the residue by the wet magnetic separation may be recycled back to the leaching step as in the preferred embodiment.

In the above-described alternative embodiments of the process of the invention, the increases in the titanium dioxide content of the residue from the leaching step for the magnetic separation, roasting and electrical separation are similar to the increases for the like steps in the preferred embodiment.

The principal difference between the prior art processes and the present process is the final magnetic separation, roasting and electrical separation steps of the present process. These three steps combine with the reducing and leaching steps to increase the titanium dioxide content of the final product approximately 10–13 percent by weight above the results obtainable by the prior art processes. This beneficiation range represents a significant increase as far as commercial acceptability of the product for use in pigment, catalyst and metal production processes is concerned.

The liquors produced during the leaching step preferably are treated by conventional methods to produce ferric oxide or metallic iron and hydrochloric acid. The acid produced preferably is recycled back to the leaching step to thus reduce the input of fresh acid required to achieve the desired leaching.

The following examples illustrate the results obtainable with the process of the invention.

EXAMPLE 1

A quantity of low grade beach sand ilmenite, having the chemical composition set forth in Table I, is introduced into a fluidized bed furnace. Hydrogen gas is introduced into the furnace at a ratio of hydrogen gas to feed material of 0.06:1 by weight. The temperature within the furnace is raised to 700° C and maintained at such temperature for 110 minutes. After that period of time, the resulting product is removed from the furnace and permitted to cool to room temperature under essentially non-oxidizing conditions. A sample of the reduced material is analyzed, showing that 96 percent of the iron compounds have been reduced to ferrous oxide and metallic iron, and that the percentage by weight of metallic iron in the reduced material is 8 percent by weight.

The reduced material is then passed through a lift-type induced roll magnetic separator of the type disclosed in the aforementioned Grieve et al. patent to separate essentially all of the particles containing unreduced ferric oxide therefrom.

The material is then leached in a conventional leaching vessel with dilute hydrochloric acid having an acid concentration of 22 percent acid by weight. The leaching is performed at a temperature of 105° C and at an acid to material ratio of 4.9:1 by weight. The leaching is permitted to continue for ten hours during which hydrogen gas is evolved, and the pressure within the vessel increases to 15.25 psia.

The liquor and residue produced by the leaching are introduced into a centrifugal filter and the liquor filtered from the residue. The liquor removed from the filter is analyzed qualitatively and found to contain substantial quantities of ferrous chloride and appreciable quantities of ferric chloride.

The residue removed from the filter is washed and then introduced into a conventional gas fired rotary dryer and retained therein only long enough to drive off the surface liquid remaining on the residue particles. After drying, the residue is analyzed and found to contain 85 percent titanium dioxide by weight.

The residue is then passed through an induced roll magnetic separator of the type disclosed in the aforementioned Carpenter patent to separate essentially all iron values remaining therein. After passage through the separator, the material is again analyzed and found to contain 88 percent titanium dioxide by weight.

The material is then introduced into a roasting tower and roasted for 20 minutes at a temperature of 700° C. After roasting, the material is permitted to cool to room temperature and again analyzed, showing a titanium dioxide content of 93 percent by weight.

Finally, the roasted product is passed through an ion bombardment electrification separator of the type disclosed in the aforementioned Breakiron et al patent to separate essentially all silicon values therein. After passage through the separator, the final product is analyzed and found to contain 96 percent titanium dioxide by weight.

EXAMPLE 2

A quantity of low grade beach sand ilmenite, having the chemical composition set forth in Table I, is treated by the same reducing, initial magnetic separation, leaching, filtering and washing steps as set forth in Example 1.

After washing, the leaching residue is introduced into a roasting tower and roasted for 32 minutes at a temperature of 700° C. After roasting, for assay purposes, a small portion of the roasted material is permitted to cool to room temperature and analyzed, showing a titanium dioxide content of 90 percent by weight.

The remainder of the roasted material is introduced into a contact electrification separator of the type disclosed in Lawver U.S. Pat. No. 2,805,769 to remove the silicon values therein. The material is introduced into the separator after roasting and while it is still at a temperature in the range of from about 150° C to about 200° C to eliminate any effects of surface moisture and humidity. In this separator, the roasted material is introduced into a vibratory feed trough in which the particles are differentially charged by contact electrification. The particles containing silicon values are triboelectrically charged more negatively than are the particles containing titanium and iron values. The differentially charged particles are then discharged from the trough and fall freely between a pair of oppositely charged elongated electrodes. As the particles pass between the electrodes, they are deflected differentially as a result of their differential charges and thereby separated. After passage through the separator, the separated fraction containing titanium and iron values is analyzed and found to contain 93 percent titanium dioxide by weight.

Finally, the roasted product is passed through an induced roll magnetic separator of the type disclosed in the aforementioned Carpenter patent to separate essentially all iron values remaining therein. After passage through the separator the final product is again analyzed and found to contain 95 percent titanium dioxide by weight.

EXAMPLE 3

A quantity of low grade beach sand ilmenite, having the chemical composition set forth in Table I, is treated by the same reducing, initial magnetic separation, leaching, filtering and washing steps as set forth in Example 1.

After washing, the leaching residue is passed through a high intensity wet magnetic separator of the type disclosed in the aforementioned Carpenter patent to separate essentially all of the iron values remaining therein.

The separated particles of lesser magnetic susceptibility are then introduced into a centrifugal filter and the liquid filtered from such particles. For assay purposes, a small portion of the resulting material is dried sufficiently to drive off the surface liquid remaining on the particles and analyzed, showing a titanium dioxide content of 88 percent by weight.

The remaining portion of the particles of lesser magnetic susceptibility are introduced into a roasting tower and roasted for 30 minutes at a temperature of 700° C. After roasting, the material is permitted to cool to room temperature and again analyzed, showing a titanium dioxide content of 93 percent by weight.

Finally, the roasted product is passed through an ion bombardment electrification separator of the type disclosed in the aforementioned Breakiron et al. patent to separate essentially all of the silicon values therein. After passage through the separator, the final product is again analyzed and found to contain 96 percent titanium dioxide by weight.

As indicated by the foregoing description and examples, the process of the present invention is ideally suited for beneficiating low grade ilmenite. The process offers a solution to the long felt need for an economically attractive substitute for the use of rutile and high grade ilmenite as the source materials for producing titanium dioxide pigment, coordination catalysts and titanium metal. Moreover, the economy of the process is enhanced by the recycling to the process of two of the effluents produced, and by the production of ferric oxide or metallic iron as a by-product.

While the foregoing constitutes a detailed description of the process of the invention, it is recognized that various modifications thereof will occur to those skilled in the art. Therefore, the scope of the invention is to be limited solely by the scope of the appended claims.

I claim:

1. A process for beneficiating ilmenite to obtain a product having a relatively high titanium dioxide content comprising the steps of:
   heating particulate ilmenite at a temperature in the range of from about 600° C to about 900° C in the presence of a reducing agent until substantially all of the iron compounds contained in the ilmenite are reduced to ferrous oxide and metallic iron;
   leaching the resulting product with a dilute inorganic acid until substantially all of the iron values contained n said product are solubilized, thereby producing a liquor containing ferric and ferrous salts and a particulate residue containing titanium dioxide;
   filtering said liquor from said residue;
   magnetically separating from said residue essentially all of the iron values remaining therein;
   roasting said residue at a temperature in the range of from about 600° C to about 900° C until substantially all water of crystallization is driven therefrom; and
   electrically separating from said residue essentially all of the silicon values contained therein.

2. A process as recited in claim 1, further comprising the step of magnetically separating essentially all unreduced ferric oxide from said resulting product before said leaching step.

3. A process as recited in claim 1, further comprising the step of drying said residue before said magnetic and electrical separation steps.

4. A process as recited in claim 3, wherein said drying and roasting steps are combined in a single step before said magnetic and electrical separation steps.

5. A process as recited in claim 1, wherein said magnetic separation step is a dry magnetic separation.

6. A process as recited in claim 1, wherein said magnetic separation step is a wet magnetic separation.

7. A process as recited in claim 1, wherein said electrical separation step is an ion bombardment electrification separation.

8. A process as recited in claim 1, wherein said reducing agent is hydrogen gas.

9. A process as recited in claim 1, wherein said acid is dilute hydrochloric acid.

10. A process as recited in claim 1, further comprising the step of recycling the gas evolved during said leaching step to said heating step.

11. A process as recited in claim 1, wherein said acid is an aqueous-acid solution having an acid concentration in the range of from about 22 percent to about 25 percent acid by weight.

12. A process as recited in claim 1, wherein said leaching step is performed at a temperature in the range of from about 100° C to about 110° C.

13. A process as recited in claim 1, wherein said filtering step is performed by centrifuging said liquor from said residue.

14. A process as recited in claim 1, wherein said resulting product contains 5–15 percent metallic iron by weight.

15. A process as recited in claim 14, wherein said resulting product contains 6–9 percent metallic iron by weight.

16. A process as recited in claim 1, wherein said heating step is performed in a fluidized bed furnace.

17. A process as recited in claim 1, wherein said heating step is performed at a temperature in the range of from about 700° C to about 750° C.

18. A process as recited in claim 1, wherein said roasting step is performed at a temperature in the range of from about 650° C to about 750° C.

19. A process as recited in claim 1, wherein said ilmenite has a particle size of +270 Tyler mesh before said heating step.

20. A process as recited in claim 19, wherein said ilmenite has a particle size range of −60, +270 Tyler mesh before said heating step.

* * * * *